United States Patent Office 2,800,521
Patented July 23, 1957

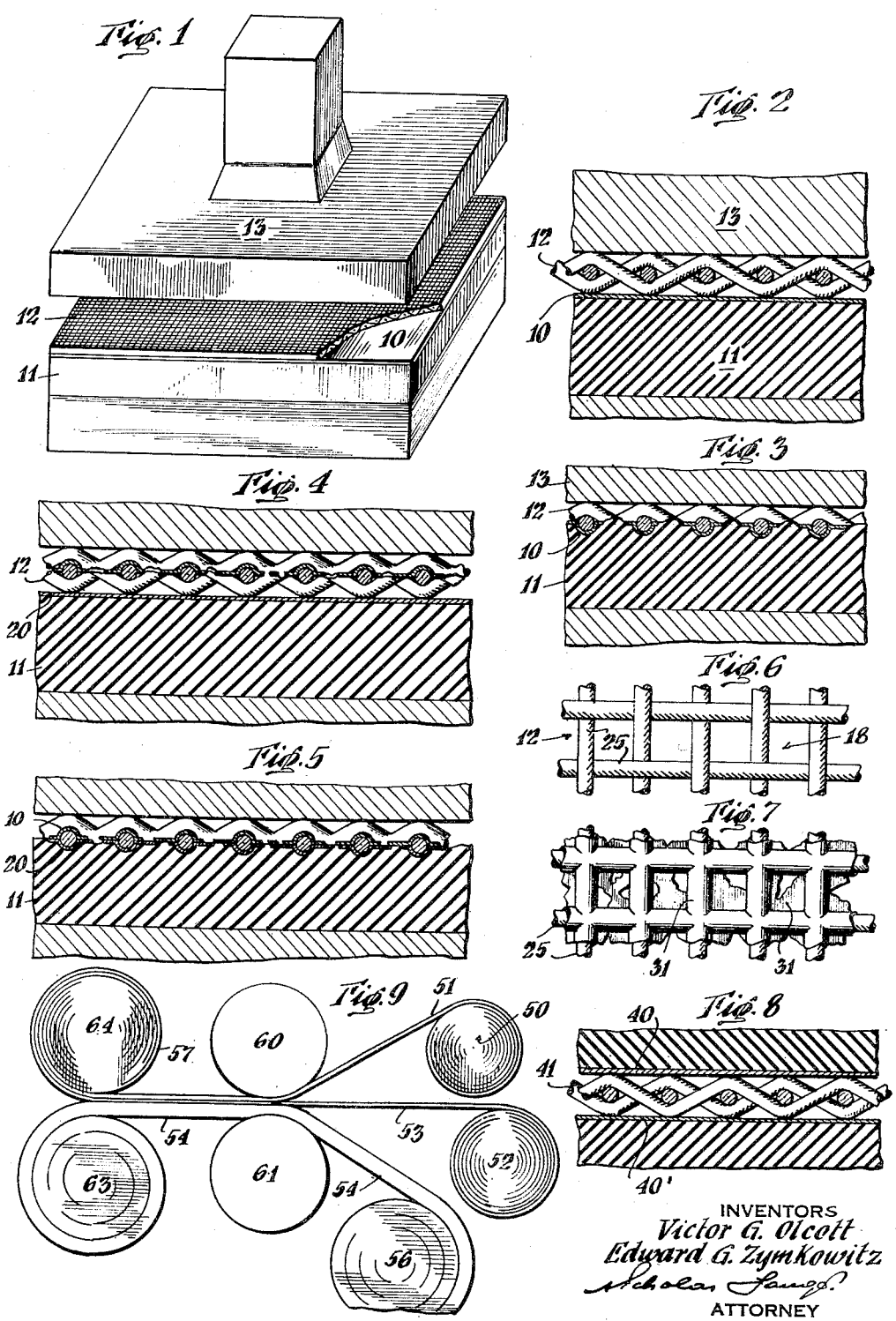

2,800,521

ELECTRODE FOR ELECTROCHEMICAL CELL

Victor G. Olcott, Bronxville, and Edward G. Zymkowitz, Yonkers, N. Y., assignors to P. R. Mallory & Co., Inc., Indianapolis, Ind., a corporation of Delaware Application September 27, 1954, Serial No. 458,372

14 Claims. (Cl. 136—125)

This invention relates to electric batteries and has specific pertinency to the construction of electrodes for such devices, including means and methods for fabricating the same.

In the construction of electric dry cells it is a desired feature that such cells be fabricated with electrodes which shall give the highest possible current densities in the utilization thereof. The present invention is directed toward attaining this result by providing a new and novel construction for improving the current density characteristics of anodes used in these batteries. Thus, the invention discloses what may be termed a "fractured" anode construction which is fabricated in accordance with the novel methods as hereinafter described. As a result of the present novel anode construction, several advantages immediately become manifest, as follows:

The invention provides exceedingly simple means for processing and fabricating anodes which give higher current density characteristics than were formerly obtainable heretofore. As a matter of fact, it has been found that the instant anode construction increases the capacity of the cell by a factor of as much as "4" under specific load conditions. Also, the present invention makes possible a leak-proof lead-out requiring no additional parts or lead-out procedures such as were heretofore used in such batteries, namely, soldering, welding and/or brazing. Further, the invention allows for the design of high-flash, high rate constructions of low capacity and provides a rigid, high-shock resistant, non-fragile type of anode. The present invention, moreover, provides for good electrolyte passage through the anode matrix, so as to enhance the conductivity and rate-carrying ability of the anode and so as to increase the efficiency of the battery structure.

Therefore, it is an object of the present invention to provide an improved electrode which gives a higher current density characteristic than was heretofore obtainable in cells of this type.

Another object of the present invention is to provide new and novel means for fabricating what may be termed a "fractured" type of anode construction, enabling the attaining of high current densities for such anode.

Still another object of the present invention is to provide a cell construction in which the electrode thereof is made according to a new and novel method so as to provide a structure giving greater efficiency, while at the same time affording a simple and cheap manufacturing process for such an electrode.

The invention in another of its aspects relates to novel features and instrumentalities described herein for teaching the principal object of the invention and to the novel principles employed in the instrumentalities, whether or not these features and principles may be used for the said object or in the said field.

Further objects and advantages and details of the invention considered to be novel will become apparent from the following description and the claims appended hereto, taken in conjunction with the accompanying figures of the drawing, in which:

Fig. 1 is a perspective, elevational view, useful in illustrating the constituent relationship of the material used therein during the fabrication of the anode of the battery.

Fig. 2 is an amplified, illustrative drawing, useful in depicting the condition of the materials and their location with respect to each other prior to having a pressure platen exerted on one side of a wire mesh placed adjacent to the anode foil.

Figs. 3 to 5 are amplified drawings, useful in depicting the steps relating to the manufacture and/or fabrication of the fractured anode of the present invention so that opposite sides of the wire mesh may have individual sheets of anode foil applied thereagainst; said sheets being forced between the interstices of said wire mesh and about the separate strands thereof to obtain the novel construction of the "fractured" anode disclosed by the present invention.

Fig. 6 illustrates the wire mesh material of the anode and wherein such strands of the wire mesh are shown to be non-adorned prior to the steps developed in Figs. 2 to 5.

Fig. 7 is an amplified illustration of a portion of the fractured anode structure resulting from the steps of the method shown in fabricating the same as disclosed in the prior figures of the drawing and as compared to the structure shown in Fig. 6.

Fig. 8 illustrates the fabrication of a fractured anode by simultaneously placing two strips of anode foil adjacent the wire mesh and applying pressure thereto via neoprene placed between the platens and the foil.

Fig. 9 illustrates a method of fabricating the fractured anode and constructing the same in a substantially continuous manner.

Generally speaking, the present invention discloses means for constructing and/or fabricating a high current density electrode for primary cells or batteries. The electrode, such as an anode, is constructed in a manner so that the term "fractured electrode" may be suitably applied thereto, since the anode material is tightly placed about strands of metallic mesh utilized therewith, while folds of the anode material are pressed into the interstices of the wire mesh so as to be tightly contained and packed therewithin.

To accomplish this structure, a method is used whereby strips of anode foil are placed next a wire screen with the foil residing on a resilient form, such as a neoprene sheet. In the process, the neoprene sheet is forced into the spaces or interstices of the screen, thus fracturing the anode metal while circumscribing the separate strands of the screen therewith. In this fashion an integral structure is obtained wherein the metal is placed tightly packed within the interstices of the screen and is integrally joined to the metal circumscribing the strands of the wire mesh. There is thus formed a new and novel electrode structure having exceedingly good current density characteristics and which further provides a highly efficient electrode for primary cells.

Now, referring to the figures of the drawing, the "fractured" type of electrode construction is disclosed and the method for fabricating the same is illustrated. Fig. 1 represents the placement of the structures and their relationship with respect to each other as the process is begun. A strip of metal foil for the anode 10, such as zinc, lead, indium, etc., is placed on a neoprene sheet of a determined thickness in accordance with the pressure to be applied against the wire mesh and anode foil. The anode foil 10 is then covered with a wire cloth matrix 12, such as, for example, one made of steel, copper, brass and/or silver. However, the mesh can be fabricated of various types of ferrous and non-ferrous materials and may further include base metals or other substances which can be placed with suitable circumscribing material. Directly above the higher matrix is placed a platen 13, which is adapted to exert a pressure of approximately 70 tons on the entire assembly. This pressure is exerted for a time which is directly a function of the thickness of the foil, wire diameter, neoprene and the mesh size of the matrix cloth being used.

Fig. 2 represents the point just prior to lowering the platen on the wire mesh, which is shown in Fig. 6 as being the unwrapped condition.

In Fig. 3 the pressure is now being applied, where, as a result, the neoprene 11 is being forced in the interstices of the screen or matrix 12, while simultaneously fracturing the anode metal 10 and wrapping it around the outer surfaces of the strands 25 of the metal cloth matrix.

In Fig. 4 there is illustrated the step of placing a second sheet of foil 20 on the opposite side (21) of the wire mesh 12 and pressing the foil against this side in a manner similar to that shown in Fig. 5. Thus, the completed anode has the general appearance of a separated metal anode, wherein the anode foil completely circumscribes the woof and warp of the metallic strands 25 and places them tightly in packed layers of anode metal 31 in the interstices 18 of the screen. Such a structure is shown in Fig. 7 hereof.

In Fig. 8 the method and construction is shown as having the foil 40 and 40¹ applied to both sides of the wire mesh 41 at one and the same time so as to give the fractured type of anode as described above with neoprene placed between the platens and zinc foil.

It is apparent, too, that the method may be mechanized, as shown in Fig. 9 of the drawing, where a spool 50 unwinds sheets of anode foil 51 and wherein spool 52 unwraps a wire mesh screen 53, which together may be pressed between rollers 60 and 61 in a continuous manner on a layer of neoprene 54 coming from spool 56. The neoprene 54 and fractured anode structure 57, as represented in Fig. 7, are separately and individually wound about spools 63 and 64.

In the work performed in developing the above fractured anode type of structure, many variations of pressing techniques, anode metals, and wire cloth type matrices have been successfully attempted. Present data indicates it is possible to press anode foil ranging in thickness from .001″ to .004″ and utilizing wire cloth type matrices of from 14 mesh (.017″ wire diameter) to 60 mesh (.0075″ wire diameter). In addition, it has also become apparent that mesh sizes finer than 60 mesh can be used. In the final analysis, therefore, only questions of practicality limit the maximum and minimum thickness of foil that can be successfully fractured.

A typical structure obtained by this method of processing is described as follows: A 50 mesh tin-plated steel screen is utilized as the vehicle for carrying two zinc foils of .001″ thickness, one on either side of the steel matrix, press at 50 tons and utilizing no dwell time and a 1/16 of an inch neoprene backing, results in an anode plate of .019″±.001″ thickness.

While the present invention describes a novel type of anode structure and details a method performing the same, it is not intended that the invention be limited to the embodiments thereof, but rather to be given its proper scope and intent, as shown by the following claims.

We claim:

1. An electrode for a battery comprising a screen, said screen comprising a multiplicity of criss-crossing strands, a multiplicity of interstices contained between the strands of said screen, electrode foil material tightly packed into each of said interstices to be contained therewithin, said strands of said screen being circumscribed by layers of said aforesaid foil material, and said foil material in said interstices being interconnected by said circumscribed layers of said strands of said screen whereby an electrode having high current carrying characteristics is provided.

2. An anode for a battery comprising a screen, said screen comprising a multiplicity of criss-crossing tin-plated strands, a multiplicity of interstices contained between the strands of said screen, anode foil material tightly packed into each of said interstices to be contained therewithin against said strands of said screen to be held therebetween, said strands of said screen being further enwrapped by said aforesaid anode foil material, and said circumscribed layers of said wire strands whereby a unitary electrode having high current carrying characteristics is provided.

3. An anode for a battery comprising a wire cloth screen, said screen comprising a multiplicity of criss-crossing strands of tin plated steel, a multiplicity of interstices contained between the strands of said screen, zinc foil tightly packed into each of said interstices to be held against the strands of said screen, said strands of said screen being further circumscribed by thicknesses of the aforesaid zinc foil, and said foil in said interstices being interconnected by said circumscribed layers of said wire strands whereby an electrode having high current carrying characteristics is provided.

4. A method of fabricating an electrode of high current carrying characteristics comprising the steps of applying a sheet of foil to a neoprene pad, placing a screen containing interstices formed of its multiple crossing strands against said foil, forcing said foil into said interstices of said screen and about said strands to give an integrally formed electrode structure, and stripping said structure from said neoprene.

5. A method of fabricating an electrode of high current carrying characteristics comprising the steps of applying a sheet of metallic foil to a neoprene backing, placing a screen of a desired mesh and containing interstices formed of its multiple crossing strands against said sheet of foil, applying pressure thereto so as to shear said foil and to force it into said interstices while at the same time circumscribing said strands to give an integrally formed electrode structure, and removing said electrode structure from said backing.

6. A method of fabricating an electrode of high current carrying characteristics comprising the steps of applying a sheet of foil to a resilient pad, placing a metal screen of a desired mesh and containing interstices formed of its multiple crossing strands against said foil, fracturing said electrode foil and forcing the same into said interstices and about the strands thereof to give an integrally formed electrode structure, and removing said structure from said resilient pad.

7. A method of fabricating a high current carrying electrode comprising the steps of applying sheets of metal foil to a neoprene pad, placing a screen of a desired mesh and containing interstices formed by its crossing strands between said sheets, forcing said foil into said interstices and about said strands to give an integrally formed electrode structure, and stripping said structure from said neoprene pad.

8. A method of fabricating a current carrying electrode for a battery comprising the steps of placing sheets of electrode material against a resilient form, placing a wire screen having interstices formed of a multiplicity of strands thereagainst, applying presure to said screen, electrode material and resilient form for a period of time dependent upon the thickness of said material, forcing said resilient form between said interstices of said wire mesh, fracturing said electrode material and packing the same tightly into said interstices and circumscribing said strands of said mesh with said electrode material, removing said resilient form from said interstices and obtaining an integral electrode whose interstices contain tightly packed electrode material integrally joined with said circumscribed strands of wire mesh of the same electrode material.

9. A method of fabricating a current carrying electrode for a battery cell comprising the steps of placing a layer of electrode material having a thickness varying from .001" to .004" on a neoprene form, placing a wire cloth screen of from 14 to at least 60 mesh having interstices formed of a multiplicity of strands thereagainst, applying a pressure of approximately 70 tons to said cloth screen, electrode material and neoprene form, forcing said neoprene form between said interstices of said wire mesh, carrying said electrode material on said form into said interstices, and circumscribing said strands of said mesh with said electrode material, removing said neoprene form from said interstices and obtaining an integral electrode whose interstices contain tightly packed electrode material integrally joined with circumscribed strands of wire mesh of the same electrode material.

10. A method of fabricating a fracture type zinc electrode for a battery cell comprising the steps of placing a layer of zinc electrode foil on a 1/16" neoprene backing, placing a 50 mesh tin plated steel screen having interstices and a multiplicity of criss-crossing strands thereagainst, applying pressure to said screen, zinc foil and said neoprene backing, forcing said neoprene backing between said interstices of said screen, pressing said zinc foil tightly into said interstices, and circumscribing said strands of said screen with said zinc foil, removng said neoprene backing from said interstices and obtaining an intergal zinc electrode whose interstices contain tightly packed zinc electrode material integrally joined with zinc circumscribed strands of wire mesh to give an electrode of .019" ±.001" thickness.

11. An electrode for a battery comprising a screen of a determined mesh, said screen including a multiplicity of criss-crossing strands, a multiplicity of interstices of said screen formed by the strands thereof, a sheet of foil material placed adjacent thereto, pieces thereof being severed and tightly packed into said interstices to be held by said strands therewithin, said strands further being circumscribed by said foil material, and said pieces in said interstices being interconnected by said foil on said strands whereby an electrode having high current carrying characteristics is provided.

12. An electrode for a battery comprising a screen, said screen including a multiplicity of criss-crossing strands, a multiplicity of interstices of said screen formed by the strands thereof, individual foil sheets placed on each side of said screen, pieces thereof being tightly packed into each of said interstices to be contained therewithin, said strands of said screen being circumscribed by said foil, and said pieces in said interstices being interconnected by said circumscribed foil on said strands whereby an electrode having high current carrying characteristics is provided.

13. An electrode for a battery comprising a matrix, said matrix comprising a multiplicity of criss-crossing strands, a multiplicity of interstices of said matrix formed by the strands thereof, electrode material placed on said matrix, sheared pieces thereof being tightly packed into each of said interstices and held against its strands, said strands of said matrix being further circumscribed by layers of said electrode material, and said sheared electrode pieces in said interstices being interconnected by said circumscribed layers of said strands to form an electrode having high current carrying characteristics.

14. An electrode for a battery comprising a tin plated steel wire cloth matrix of from .017" to .0075" wire diameter, said matrix comprising a multiplicity of criss-crossing strands, a multiplicity of interstices of said screen formed by the strands of said matrix, electrode foil material of from .001" to .004" thickness tightly packed into each of said interstices to be contained therewithin, said strands of said material being circumscribed by layers of said aforesaid electrode material, and said material in said interstices being interconnected by said circumscribed layers of said wire strands whereby an electrode having high current carrying characteristics is provided.

References Cited in the file of this patent

UNITED STATES PATENTS

| Number | Name | Date |
|---|---|---|
| 1,321,947 | Sperry | Nov. 18, 1919 |
| 1,533,568 | Pouchain | Apr. 14, 1925 |
| 2,357,578 | Brownback | Sept. 5, 1944 |